(12) United States Patent
Ougier et al.

(10) Patent No.: US 11,364,667 B2
(45) Date of Patent: Jun. 21, 2022

(54) EXTRUSION EQUIPMENT COMPRISING AN IMPROVED EXTRUSION HEAD

(71) Applicant: Compagnie Generale Des Etablissements Michelin, Clermont-Ferrand (FR)

(72) Inventors: Christophe Ougier, Clermont-Ferrand (FR); Arnaud Letocart, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 289 days.

(21) Appl. No.: 16/469,890

(22) PCT Filed: Dec. 22, 2017

(86) PCT No.: PCT/FR2017/053834
§ 371 (c)(1),
(2) Date: Jun. 14, 2019

(87) PCT Pub. No.: WO2018/115797
PCT Pub. Date: Jun. 28, 2018

(65) Prior Publication Data
US 2019/0315036 A1  Oct. 17, 2019

(30) Foreign Application Priority Data

Dec. 22, 2016 (FR) ..................................... 1663256

(51) Int. Cl.
*B29C 48/025*  (2019.01)
*B29C 48/25*  (2019.01)
(Continued)

(52) U.S. Cl.
CPC ............ *B29C 48/025* (2019.02); *B29C 48/07* (2019.02); *B29C 48/12* (2019.02); *B29C 48/16* (2019.02);
(Continued)

(58) Field of Classification Search
CPC ..... B29C 48/16; B29C 48/07; B29C 48/3001; B29C 48/025; B29C 48/2562;
(Continued)

(56) References Cited

U.S. PATENT DOCUMENTS 5,267,846 A   12/1993  Miyama et al.
7,311,505 B2  12/2007  Ohki et al.
(Continued)

FOREIGN PATENT DOCUMENTS

CN    102811849 A   12/2012
DE       2619983 A1   11/1976
(Continued)

OTHER PUBLICATIONS

Watanabe et al., JP 2000-117813 A, Machine Translation, Apr. 2000 (Year: 2000).*
Int'l Search Report for PCT/FR2017/053834, dated Apr. 5, 2018.

*Primary Examiner* — Galen H Hauth
(74) *Attorney, Agent, or Firm* — Dickinson Wright PLLC; Steven C. Hurles

(57) ABSTRACT

An installation for producing a profiled band based on several mixtures of elastomers of a different composition by means of coextrusion. The installation includes at least two extruders for supplying a mixture of elastomers to an extrusion head. The extrusion head comprises an assembly of at least two plates which are arranged side by side. Each plate having at least one cavity which enables the mixture from an extruder to be chaneled towards an outlet hole. The plates are arranged substantially transversely relative to the (Continued)

output direction of the mixture flows of the extruders in order to produce a discharge at approximately 90° of the mixture flow at the outlet of the screw of each extruder.

15 Claims, 4 Drawing Sheets

(51) Int. Cl.
  *B29C 48/49* (2019.01)
  *B29C 48/21* (2019.01)
  *B29C 48/30* (2019.01)
  *B29C 48/12* (2019.01)
  *B29C 48/16* (2019.01)
  *B29C 48/07* (2019.01)
  *B29K 21/00* (2006.01)

(52) U.S. Cl.
  CPC .......... *B29C 48/21* (2019.02); *B29C 48/2562* (2019.02); *B29C 48/25686* (2019.02); *B29C 48/3001* (2019.02); *B29C 48/304* (2019.02); *B29C 48/49* (2019.02); *B29K 2021/003* (2013.01)

(58) Field of Classification Search
  CPC ... B29C 48/49; B29C 48/21; B29C 48/25686; B29C 48/304; B29C 48/12
  See application file for complete search history.

(56) References Cited

U.S. PATENT DOCUMENTS

| 2013/0011506 A1 | 1/2013 | Fay et al. |
| 2013/0011638 A1 | 1/2013 | Ausen et al. |
| 2018/0147769 A1* | 5/2018 | Reineke ................. B29C 48/49 |

FOREIGN PATENT DOCUMENTS

| EP | 0528560 A1 | | 2/1993 |
| JP | 2000-117813 A | | 4/2000 |
| JP | 2000117813 A | * | 4/2000 |
| JP | 4053687 B2 | | 11/2000 |
| JP | 2000318016 A | | 11/2000 |
| JP | 2005-254464 A | | 9/2005 |
| WO | 2011/119309 A2 | | 9/2011 |
| WO | 2011/119324 A2 | | 9/2011 |
| WO | 2015/028166 A1 | | 3/2015 |

* cited by examiner

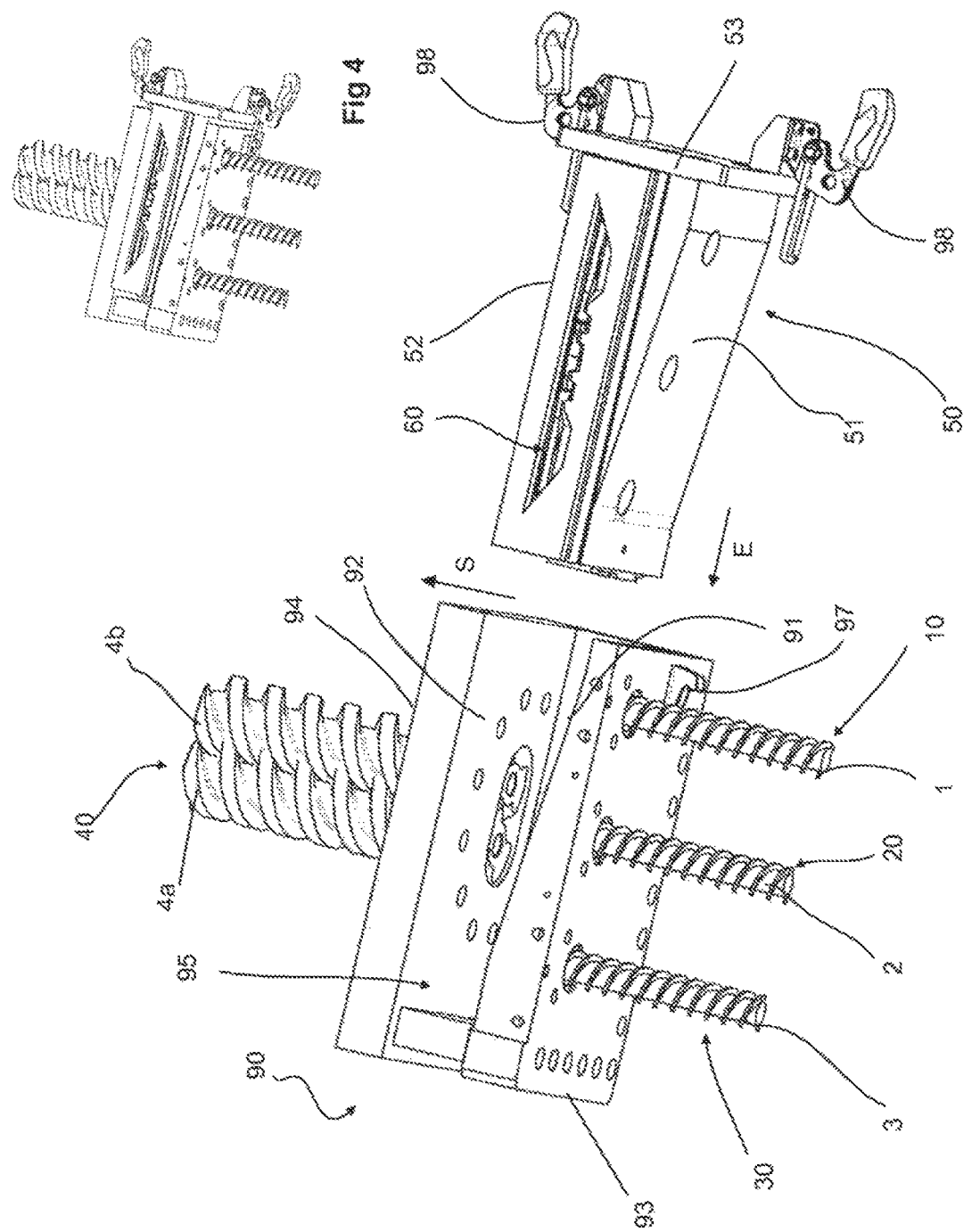

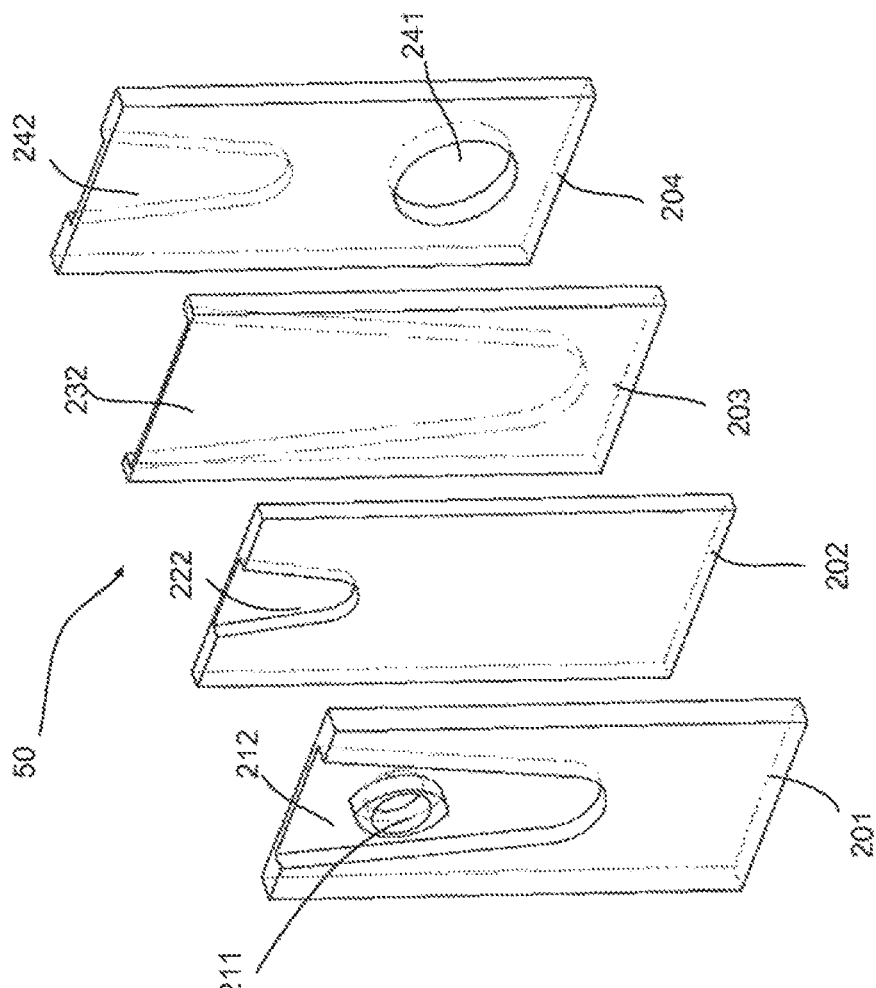
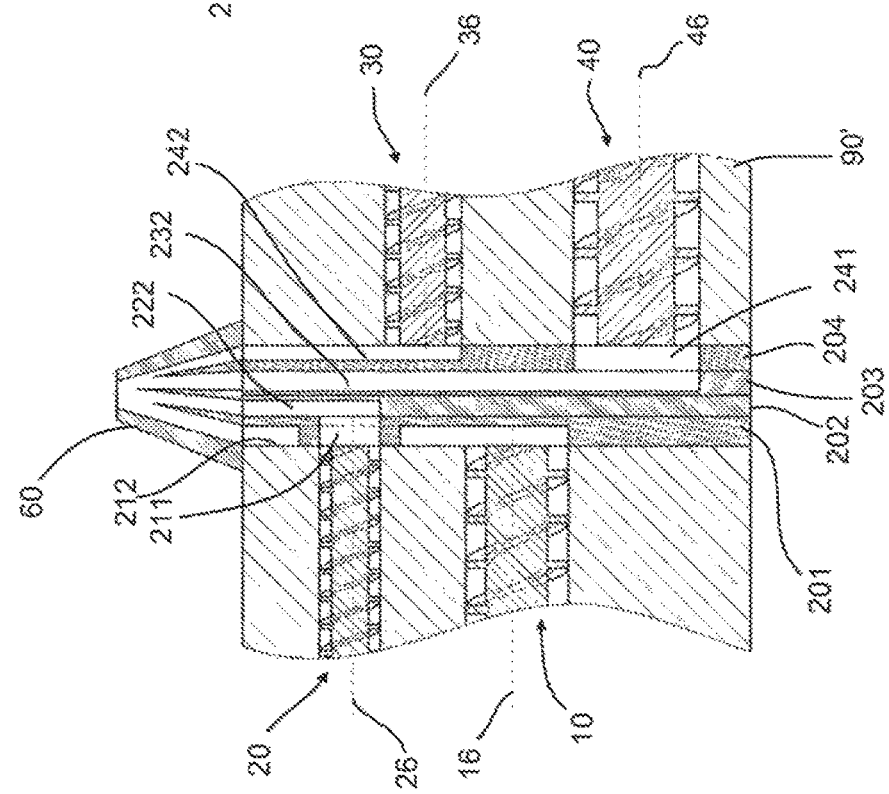

EXTRUSION EQUIPMENT COMPRISING AN IMPROVED EXTRUSION HEAD

CROSS-REFERENCE TO RELATED APPLICATION

The present application claims priority to PCT International Patent Application No. PCT/FR2017/053834, filed Dec. 22, 2017, which claims priority to FR 1663256, filed Dec. 22, 2016.

BACKGROUND

1. Field of the Invention

The subject disclosure relates to the field of extrusion of mixtures of elastomers which are intended for the production of tires. More specifically, it relates to the production of coextruded complex profiles based on mixtures of elastomers of different compositions.

2. Related Art

In known manner, the production of complex profiles by means of extrusion of at least two mixtures of elastomers of different compositions, or coextrusion, uses at least two extruders. Each extruder is formed by a cylindrical member or sheath which is fixed and at the inner side of which there is a screw which is coaxial with the longitudinal axis of the sheath and which is driven in rotation about the axis. It has the function of homogenising a rubber mixture which is introduced therein and pushing it towards an outlet die. For a complex product, the outlet die receives several mixtures of elastomers of different compositions and determines the profile of the rubber band. This profile is defined by a fixed profiled plate which cooperates with a rotating roller or with a fixed wall.

Currently, the use of complex products is becoming increasingly widespread in order to reduce the number of successive positionings of products during assembly, to reduce the costs and to improve the quality of the final product. It is preferable to obtain these complex products by means of coextrusion since this method ensures better mutual cohesion of the different components. Thus, the number of components which form a complex profile has a tendency to increase, which makes production tooling and the spatial requirement thereof complex.

Document WO 2015/028166 is thus known and describes a coextrusion installation using five extruders which are arranged in parallel and which are used for the production of a tread for a tire. A complex profile is thus obtained by means of coextrusion of different mixtures which converge via five different channels towards a common extrusion head provided at the outlet of a profiling device. The extruders are all arranged at the side opposite that of the product outlet. As a result of the convergence of the flows of mixtures at one side, the spatial requirement of the extrusion head is very significant and the installation has to comprise very robust locking mechanisms for the extrusion head in order to counteract the extrusion pressure.

A solution to this problem is described in document JP 4053687 which proposes arranging different extruders at one side and the other of the outlet die of the coextruded complex product. The coextrusion assembly according to this document comprises a fixed extrusion head which is provided with an outlet die in the lower central portion and three extruders which are fixedly mounted, two at the right and one at the left of the die. The forces absorbed by the extrusion head are certainly less than in the preceding document as a result of the more advantageous arrangement of the extruders. However, the extrusion head of this document comprises very deep preforming channels which connect the extruders to the die. As a result, the extrusion assembly of this document produces many losses during the changes of the mixtures. Furthermore, since the pressure drop is proportional to the length of the transfer channels, it is found to be very significant in the coextrusion assembly of this document.

There is also known from document U.S. Pat. No. 7,311,505 another extrusion installation which comprises a fixed extrusion head which is provided with an outlet die at the lower central portion and four extruders which are fixedly mounted, two at the right and two at the left of the die. The extrusion head further comprises three movable portions which are caused to move at the end of the operation in order to open the head and to afford access to the deep channels which connect the extruders to the extrusion die. Being produced in a more advantageous manner than that of the preceding document, the structure of the extrusion head of this document is found to be quite complex and must use various mechanisms and actuators in order to ensure the opening and closing of different portions which compose the extrusion head, in particular for the purposes of cleaning. When the coextruded profile is changed, it is necessary to comply with the order in which the mixtures arrive in the extrusion head, which involves warming up each extruder before starting a new operation.

One problem which is not solved by the documents of the prior art is therefore the possibility of changing the assignment order of the extruders in accordance with the dimensions of the cross-section of the profile with a given coextrusion installation and enabling mixtures of different types of elastomers to be extruded without mixing the different mixtures introduced into the same extrusion head.

SUMMARY OF THE INVENTION

An objective of the disclosure is to overcome the disadvantages of the above-mentioned documents and to provide an original solution in the design of the extrusion head which enables a notable reduction of the losses during a change of the mixtures which form a coextruded profile and which enables a coextruded profile to be obtained in accordance with the shapes and dimensions desired preventing problems of inflation of the profile at the outlet.

This objective is achieved by the disclosure which proposes an installation for producing a profiled band based on several mixtures of elastomers of a different composition by means of coextrusion, comprising at least two extruders for supplying a mixture of elastomers to an extrusion head, the extrusion head comprising an assembly of at least two plates which are arranged side by side, each plate comprising at least one cavity which enables the mixture from an extruder to be channelled towards an outlet hole, characterised in that the plates are arranged substantially transversely relative to the output direction of the mixture flows of the extruders.

The extrusion head comprises a plurality of plates which are arranged side by side, each one comprising a cavity which forms a transfer channel for a mixture of elastomers from an extruder in order to transfer it to a profiling outlet hole, for example, an extrusion die. The term plate is intended to be understood to be a wide and relatively thin, generally parallelepipedal component. Each plate is arranged with one of the faces thereof (face is intended to be understood to be the surface which has larger dimensions than those of the edge or the profile) substantially transversely relative to the output direction of the flow of the mixture of the corresponding extruder, which direction is parallel with the longitudinal axis of the extruder.

All of the plates of the extrusion head are arranged so that the face of one plate which receives the incoming mixture(s) is substantially perpendicular to the flow of the incoming mixture(s). A plate thus has an inlet hole for the flow which is coaxial with the arrival direction of the incoming flow, which hole communicates with a transfer channel towards the outlet of this mixture flow, which channel is formed in the thickness of the plate. The transfer channel is a conduit which comprises at least one planar wall which is parallel with the plane of one of the faces of the plate and which is substantially perpendicular to the axis of the inlet hole of the mixture flow in the plate. Each plate of the extrusion head thus enables a discharge of the outgoing mixture flow which is orientated by the transfer channels of the plate at approximately 90° relative to the arrival direction of the incoming mixture flow as received at the outlet of the screw of each extruder.

In this manner, the plate is arranged substantially transversely relative to the direction of the flow, it is understood that the plate is arranged so as to face, with the surface thereof which has larger dimensions than that of the edge, the flow of the mixture arriving, therefore substantially perpendicularly to the plane of the plates, and to abruptly change the orientation thereof by an angle equal to that of its arrangement. Such an angle is approximately 90° with a tolerance of 20°. Preferably, such an angle is between 70 and 110°. It will be understood that the plate has an inlet hole which communicates directly with the outlet hole of the extruder, immediately at the end of the screw, and with a flow channel of the mixture, produced in the thickness of the plate, which channel forms a specific angle, in this instance an angle between 70 and 110° with the flow direction of the incoming flow from an extruder.

The extrusion head of plates of the disclosure therefore enables a flow towards the outlet die of the mixture in the plane of the plates and a supply perpendicularly to the plane of these same plates, for increased compactness of the installation.

Furthermore, in the installations of the prior art, the mixture conveyed between the core and the threads of the screw is compacted towards the outlet end and before the outlet hole of the extruder in a channel of significant length (understood to be along the longitudinal axis of the extruder), corresponding to the outer diameter of the screw (approximately 4 times the height of the channel). The products to be formed generally having a much smaller cross-section, it is necessary to progressively reduce the cross-section of the channels until the final geometry is obtained in the die. The viscoelastic nature of the rubber brings about more inflation at the outlet as the convergence becomes more rapid, which presents problems of controlling the geometry. Conversely, a slower convergence (therefore, in longer channels) limits the inflation but consequently increases the pressure drop and reduces the output of the machine.

In the extrusion installation of the disclosure, there is no longer a compacting step at the end of the screw with an increase of cross-section which it is then necessary to reduce. The discharge at approximately 90° of the extrudate at the outlet of the screw of the extruder, without passing via an arch or convergence cone towards the intermediate front, enables a degree of continuity to be obtained for the flow cross-section of the channels of the screw as far as the channels of the extrusion head and the die. A ratio of inflation/pressure loss is thus obtained and is therefore much better than in the solutions of the prior art.

In this manner, the Applicants have found, during tests carried out in the laboratory, that a shorter path without changing the passage cross-section of the mixture between the outlet of the extruder and the inlet into the extrusion head enables the forces applied to the mixture and consequently the inflation at the outlet of the die to be reduced.

Preferably, the outlet hole of an extruder communicates without changing either direction or outlet cross-section with the inlet hole in the cavity of a plate. If it is necessary to make the outlet of the extruder communicate with a plate via intermediate walls, this enables it to be done without a pressure drop.

Advantageously, the plates are planar and mutually parallel. This enables simplified construction and machining of the assembly.

Preferably, the cavities form channels which extend in a direction parallel with the planes of the plates and perpendicular to the longitudinal axes of the extruders.

The longitudinal axis of an extruder is aligned with the longitudinal axis of the sheath and is parallel with the mixture flow direction output by the extruder. Such an arrangement enables the mixture entering the extruder head to be channelled towards the outlet, in the plane of the plate, and the channels to be provided with different shapes over the extent thereof. Such channels are recessed in the thickness of the plates which they follow in the direction of the extrusion die, which enables the axial spatial requirement of the extrusion head to be reduced and thus a very compact construction thereof to be obtained.

Such a coextrusion installation in which the arrangement of the different extruders is carried out at one side and the other of an extrusion head of plates according to the disclosure, which enables an output at approximately 90° of the extruded profile relative to the arrival direction of the mixture flows, has a robust structure, whilst having significant compactness.

Advantageously, at least one plate comprises a through-hole which enables the outlet hole of an extruder to be connected to the cavity of a plate adjacent to the first.

This enables the passage of a mixture of elastomers from an extruder through a hole of the first plate as far as the transfer channel of an adjacent plate. In this manner, with an appropriate set of plates and holes, it is possible to change the arrival order of the mixtures in the extrusion head and their transfer is organised towards the outlet via the extrusion die, whilst retaining the initial arrangement of the extruders.

Such an extrusion head comprising a set of plates with a pre-established arrangement of flow channels and through-holes enables increased flexibility in terms of the design of the extrusion head. This also enables the initial operating parameters of the extruders to be retained and therefore a gain in productivity.

Preferably, the plates are removable and are held together on a common support. This enables the plates to be changed easily in accordance with the profile to be produced.

Advantageously, the support and the plates form an interchangeable extrusion head which is connected directly to the outlet holes of the extruders. In this manner, the end of the screw of each extruder arrives substantially at the level of the corresponding inlet hole in the extrusion head. The term "substantially" is intended to be understood to be flush with the corresponding inlet hole in the extrusion head or ideally at a very small distance of a few millimetres or at least less than the diameter of the extruder, and without significant reduction of the cross-section thereof. In such a configuration, there is no longer a transfer channel between the extruder and the extrusion head. In this manner, when the head is replaced, the installation is ready to begin a new production cycle.

Preferably, the extrusion head can be moved in translation between a position introduced into a support of the installation and a position removed therefrom. This enables rapid extraction of the extrusion head with a view to its replacement with a new head which is adapted to the new profile to be produced.

The installation is also provided with the means for rapidly fixing the extrusion head to the support.

Advantageously, the extruders are arranged at one side and the other of the extrusion head. This enables the forces absorbed by the extrusion head to be better compensated for.

In an advantageous embodiment of the disclosure, the installation comprises four extruders which are arranged in pairs at one side and the other of the extrusion head and it comprises four removable plates which are each provided with at least one transfer channel for the mixture from one of the extruders towards an extrusion die. This enables the extruders to be distributed at one side and the other of a very compact extrusion head.

The disclosure also relates to a method for producing a profiled band based on a plurality of mixtures of elastomers of different composition by means of coextrusion using at least two extruders which supply a mixture of elastomer to an extrusion head, characterised in that:

a set of at least two plates which are arranged side by side is selected, each plate comprising at least one cavity which enables the mixture from a dedicated extruder to be channelled towards an outlet hole and the plates are arranged substantially transversely relative to the output direction of the mixture flow of the extruders within the extrusion head;

the extrusion of the band of profiled product is carried out.

Preferably, the plates are arranged relative to the extruders so that the outlet hole of an extruder communicates without changing direction with the inlet hole in the cavity of a plate.

Advantageously, at least one plate comprises a through-hole which enables the outlet hole of an extruder to be connected to the cavity of an adjacent plate.

Preferably, the extrusion head is removed from the installation and it is replaced with another head which comprises a set of plates different from the first.

BRIEF DESCRIPTION OF THE DRAWINGS

The disclosure will be better understood from the following description which is based on the following Figures:

FIG. 3 is a perspective view of the installation of the disclosure according to another embodiment in a rest position;

FIG. 4 is a view to a smaller scale of the installation of FIG. 3 illustrated in a working position;

FIG. 7 is a cross-section of the extrusion head of the disclosure according to yet another embodiment; and FIG. 8 is an exploded view of the components of the extrusion head of FIG. 7.

DETAILED DESCRIPTION OF THE ENABLING EMBODIMENT

Figure 1:
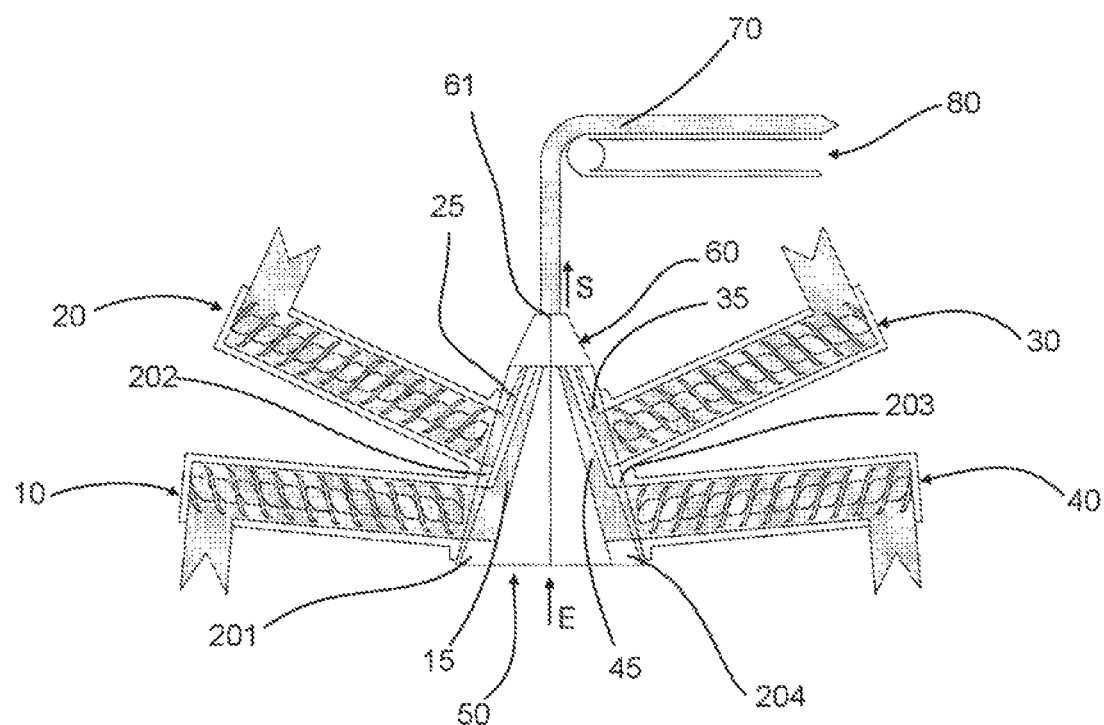
FIG. 1 is a schematic cross-section of the installation of the disclosure according to an embodiment in a working position.

In the different Figures, elements which are identical or similar have the same reference numeral. The description thereof is therefore not systematically repeated.

Figure 2:
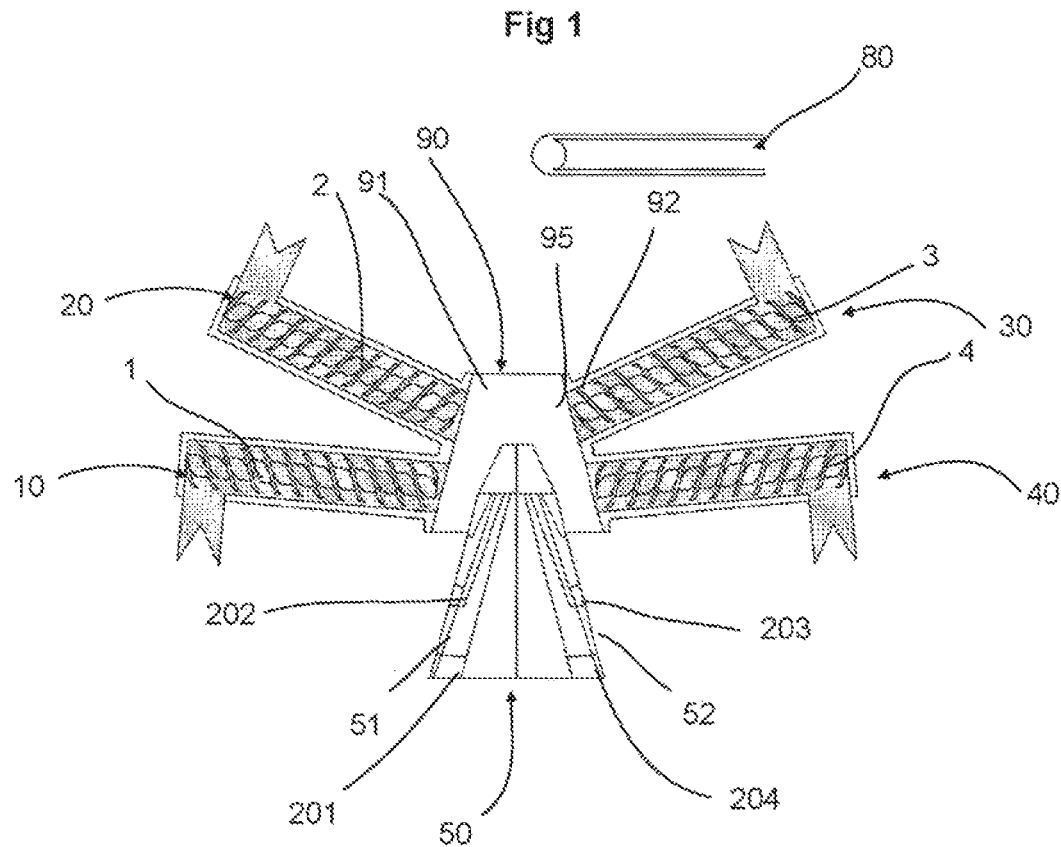
FIG. 2 is a schematic cross-section of the installation according to the disclosure in a rest position.

In FIGS. 1 and 2, the extrusion installation 1 comprises four extruders 10, 20, 30, 40, an extrusion head 50 and an extrusion die 60. The extrusion head 50 connects the outlets of the extruders 10, 20, 30, 40 to an extrusion die 60 which enables the profile to be shaped. The complex profiled band 70 is produced by the coextrusion of the four simple profiles from the different extruders which are assembled in the region of the outlet end 61. The complex profiled band 70 is then conveyed by a transport device, such as a conveyor 80.

As generally known, the various mixtures extruded by the extruders 10, 20, 30 and 40 pass through the extrusion head 50 without being mixed together and are laminated and shaped by the die 60.

Such mixtures of different elastomers are, by way of example, mixtures based on elastomers or rubber used to create a tread assembly such as: a first material of 100% natural rubber to produce a sub-layer with one, then a second material to produce the tread from 100% synthetic rubber, followed by a third and a fourth material to produce the flanks which is composed of a mixture of natural rubber/synthetic rubber (20% to 80% of natural rubber). The term mixtures of different elastomers sent into an extrusion head according to the disclosure is therefore intended to be understood to mean that at least two different mixtures arrive in the head from at least two different extruders. Identical mixtures, such as a third and a fourth mixture having the same composition, can also be received in the extrusion head from other extruders.

The different mixtures from the extruders 10, 20, 30, 40 pass through the extrusion head 50 via transfer channels without being mixed together and are shaped by the die 60. More specifically, the extrusion head 50 comprises an assembly comprising a plurality of plates 201, 202, 203, 204 which are mounted side by side, each plate comprising at least one cavity which enables the mixture from a dedicated extruder 10, 20, 30, 40 to be channelled towards the extrusion die 60.

According to the disclosure, the plates 201, 202, 203, 204 are arranged substantially transversely relative to the output direction of the mixture flows of the extruders 10, 20, 30, 40. The term plate arranged substantially transversely relative to the flow direction is intended to be understood to mean that the plate comprises a substantially planar face which is arranged so as to face the mixture flow perpendicularly thereto. The mixture flow is received through the plate via an inlet hole which is coaxial with the outlet hole of the mixture of the extruder. Each plate also comprises a transfer channel for the mixture flow which is a conduit comprising at least one planar wall parallel with the plane of the face of the plate in which it is formed and which is substantially perpendicular to the axis of the inlet hole of the mixture flow into the plate. Such an arrangement enables the orientation of the mixture flow leaving the head to be changed abruptly, relative to the direction of the incoming mixture flow, by an angle equal to that of its arrangement. Such an angle is approximately 90° with a tolerance of 20°. The discharge at approximately 90° of the extrudate at the outlet of the screw of the extruder enables a degree of continuity of the flow cross-section of the channels of the screw to be obtained as far as the channels of the extrusion head and the die. A ratio of inflation/pressure drop which is therefore much better than in the solutions of the prior art is thus achieved.

In the embodiment illustrated in FIGS. 1 and 2, the angle of inclination of the plates 202, 203 relative to the mixture flow leaving the extruders 20 and 30, which flow is directed along the longitudinal axis of each extruder, being parallel therewith, is approximately 70°. The inclination angle of the plates 201, 204 relative to the mixture flow leaving the extruders 10 and 40, which flow is directed along the longitudinal axis of each extruder, being parallel therewith, is approximately 110°. In this embodiment, each plate comprises a transfer channel 15, 25, 35, 45 which is recessed in the thickness of the plate and forms a cavity thereof orientated so that the mixture flow which arrives transversely relative to the plate via an inlet hole which is coaxial with that of the extruder output can flow in a transverse direction relative to that of the inlet flow in the direction of the outlet die 60.

According to a very advantageous aspect of the disclosure, the extruders 10, 20, 30, 40 discharge directly into an interchangeable extrusion head 50. In this manner, the extrusion head is connected directly to the extruders without there being any transfer channel for elastomer mixture between the two.

As can be better seen in FIG. 3, the extruders 10, 20, 30, 40 are arranged at one side and the other of a common support 90 and are fixed thereto. By way of example, each extruder sheath is fixed to the lateral walls 93, 94 of the support 90 by means of a flange which is provided with screw fixings and sealing joints. The support 90 is a generally prismatic block inside which there is a recess whose shape and dimensions correspond to those of the extrusion head 50 and form a housing 95 therefor. More specifically according to the disclosure, the ends of the screws 1, 2, 3 of the extruders 10, 20 and 30 arrive substantially in the region of the plane which constitutes the interface between the inner face 91 of the support 90 and the outer face 51 of the extrusion head 50. The same applies to the ends of the screws 4a, 4b of the extruder 40 which arrive substantially in the region of the plane which constitutes the interface between the inner face 92 of the support 90 and the outer face 52 of the extrusion head 50. More specifically, the ends of the screws arrive at the inlet of the through-openings which are formed in the lateral walls 93, 94 of the support 90 to enable the passage of the mixtures from the outlet holes of the extruders towards the inlet holes inside the extrusion head 50. The movement direction of the extrusion head 50 relative to the support 90, indicated by the arrow E in FIG. 1, is parallel with that of the output of the profiled product via the extrusion die 60, indicated by the arrow S in the same Figure. The extrusion die 60 is fixedly joined to the extrusion head 50 and is movably mounted therewith relative to the support 90 of the installation.

In this manner, at the end of the extrusion operation, when it is desirable to change the coextruded profiled product, the extrusion head 50 is moved away from the support 90 and it is replaced with another extrusion head specific for the new profile product. The extruders 10, 20, 30, 40 are emptied, each having discharged all the mixture during the preceding operation, and the new extrusion head being in place, it is possible to begin a new coextrusion operation without waiting.

An installation comprising an extrusion head of the disclosure thus enables the changing of the profiled product to be produced to be facilitated, the machine being clean at the end of the operation, there is therefore no longer any need to empty the transfer channels which form the installations of the prior art.

According to an advantageous aspect of the disclosure, the extrusion head 50 is a unitary assembly or block which is introduced into the support 90 and is removed therefrom by a translation movement in a pre-established movement direction. The extrusion die 60 completes the assembly which forms the extrusion head 50. In the embodiment illustrated in FIG. 3, the movement direction in translation of the extrusion head 50 is perpendicular to the longitudinal axes of the extruders 10 and 40. It is thus possible to use, for greater ease, a robotic arm which grips the extrusion head 50 and moves it relative to the support 90 in order to replace it with a new one. The movement direction of the extrusion head 50 relative to the support 90, indicated by the arrow E in FIG. 1, is perpendicular to that of the output of the profiled product, indicated by the arrow S in the same Figure.

According to an important aspect of the disclosure, at least one of the lateral walls 51 and 52 of the extrusion head 50 and at least one of the internal walls 91 and 92 of the support 90 are inclined and form the same angle relative to a plane parallel with the plane containing the movement axis of the extrusion head 50. Preferably, such an angle of inclination is small in order to limit the forces for locking the extrusion head in place, it is preferably less than 30°. For angles less than approximately 15° (depending on the friction coefficient of the contact which is dependent on the material of the components in contact), mechanical jamming may be involved in retaining the tooling. However, the value is prevented from falling below 3° since the positioning of the extrusion head is more difficult to control (with regard to the correspondence of the cylinder of the screw with the hole which extends through the extrusion head). In a preferred method, an inclination of 6° is selected.

In the method illustrated in FIGS. 3 to 6, in order to simplify the construction, only the wall 51 of the extrusion head and the corresponding wall 91 of the support are inclined, the other walls being parallel with the movement direction of the extrusion head. This construction with inclined walls enables the sealing between the internal walls of the support and the external walls of the extrusion head to be ensured during the introduction movement thereof into its housing within the support. When the extrusion head has arrived in its operating position inside the support 90, it is locked in position using rapid fixing means 99, for example, using fixing clamps 98 with articulated levers arranged between each lateral edge of the front wall 53 of the extrusion head 50 moving into engagement with hooks 97 which are fixed to the lateral walls 93 and 94 of the support 90.

In a construction variant which cannot be seen in the Figures, at least one of the lateral walls 93 94 of the support 90 can be moved in translation in a direction perpendicular to that of the movement of the extrusion head 50 when it is introduced inside the support. In this manner, once the extrusion head is installed inside the support, one and/or the other of the lateral walls of the support is/are moved closer in order to ensure the sealing between the support and the extrusion head.

The extruders which supply the extrusion head are single-screw or dual-screw extruders of known type which therefore comprise one or two endless screws which are driven in rotation by a motor inside a sheath. Preferably, at least one of the dual-screw extruders is a volumetric extruder of the dual-screw pump type comprising two counter-rotating screws with interpenetrating threads and combined profiles which are driven in rotation by motors, in opposing directions, inside a sheath. In a preferred embodiment of the disclosure, all the extruders 10, 20, 30, 40 are volumetric dual-screw extruders which ensure a constant flow rate in order to enable good precision of the profile obtained by means of coextrusion.

Figure 5:
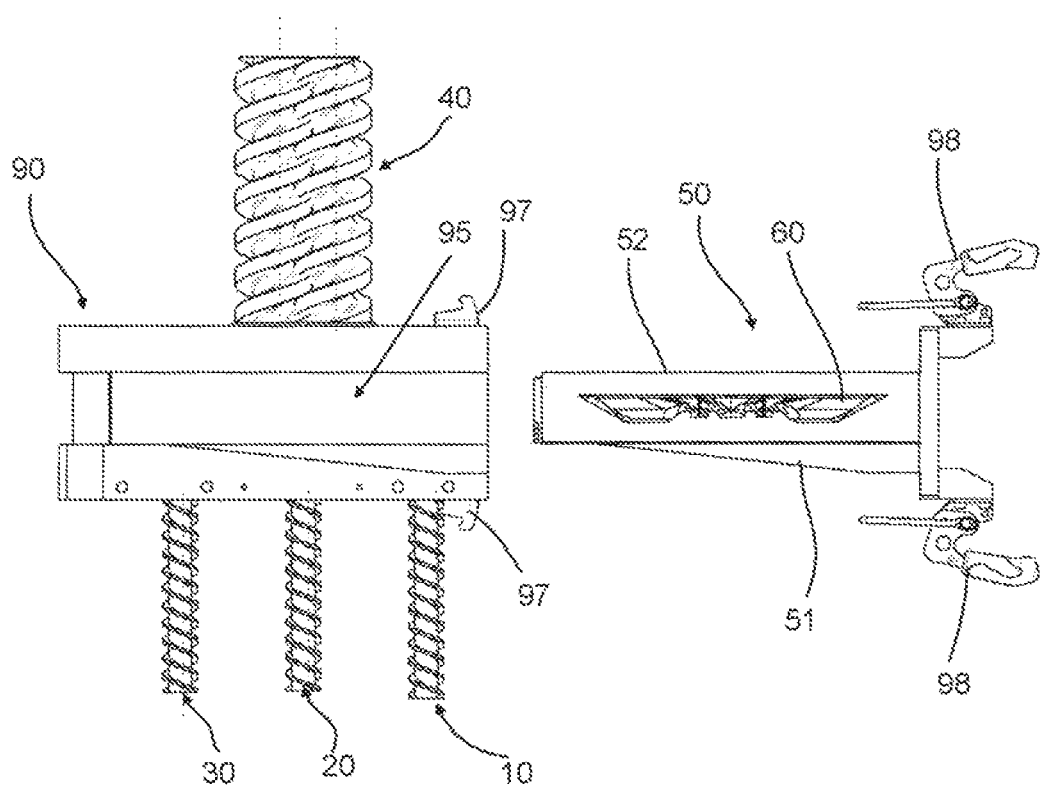
FIG. 5 is a top view of the installation of FIG. 3 in the rest position.
Figure 6:
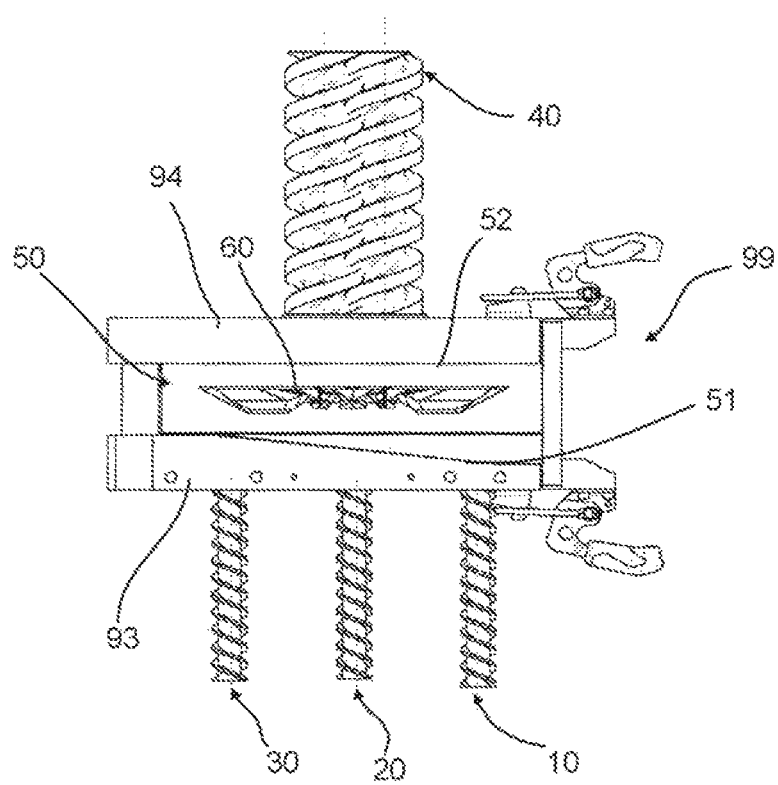
FIG. 6 is a top view of the installation of FIG. 3 in a working position.

FIGS. 5 and 6 illustrate as top views the installation of FIG. 3. The extrusion head 50 is being introduced in the housing 95 of the support 90 in FIG. 5 and it is in place inside the support 90 in FIG. 6.

Advantageously, in the embodiments illustrated in FIGS. 3 to 8, the extrusion head 50 comprises an assembly formed by a stack of parallel plates which are all perpendicular to the longitudinal axis of the extruders 10, 20, 30, 40 and therefore the direction of supply with elastomer mixture. The mixtures thus arrive via separate channels in the extrusion die 60 where they form the coextruded profiled product.

FIGS. 7 and 8 illustrate, in a simplified manner, another embodiment of the extrusion head 50 illustrating such an assembly formed by a stack of mutually parallel plates which are all perpendicular to the longitudinal axis of the extruders 10, 20, 30, 40. For increased clarity, the lateral walls which form a support for the extrusion head have been omitted in FIGS. 7 and 8. The extrusion head 50 comprises a stack of four mutually parallel planar plates which extend with their face whose surface has the largest dimension in planes perpendicular to the longitudinal axes 16, 26, 36, 46 of the extruders 10, 20, 30, 40. The plates of the extrusion head are provided with channels for transferring elastomer mixture in the direction of an outlet die, which channels extend along the plates while being formed in the thickness of each plate, in a manner parallel with the plane of the faces (and not the edges) of the plates, in the direction of an outlet die 60. Such an arrangement enables the length of the transfer channels to be reduced between the outlet ends of the extruders and the extrusion die and thus enables the pressure drop to which the extruded mixture is subjected to be reduced.

In the example illustrated in FIGS. 7 and 8, the first plate 201 comprises a cavity 212 which is recessed in the thickness of the wall of the plate, the cavity 212 having a shape which is flared upwards in the direction of the extrusion die from a base of circular form having a diameter equal to the diameter of the outlet hole of the sheath of the extruder 10. The cavity 212 thus forms a first transfer channel for mixture from the extruder 10. The first plate 201 also comprises a through-hole 211 which communicates with the second extruder 20 to transfer the mixture output thereby to the transfer channel formed in the second plate 202.

The second plate 202 comprises a cavity 222 which is recessed in the thickness of the wall of the plate, the cavity 212 having a shape which is flared upwards in the direction of the extrusion filter from a base having a circular shape with a diameter which is equal to the diameter of the outlet hole of the sheath of the extruder 30 and that of the hole 211. The cavity 222 thus forms a second transfer channel for mixture from the extruder 20.

The fourth plate 204 comprises a cavity 242 which is recessed in the thickness of the wall of the plate, the cavity 242 having a shape which is flared upwards in the direction of the extrusion die from a base of circular form having a diameter equal to the diameter of the outlet hole of the sheath of the extruder 30. The cavity 242 thus forms a fourth transfer channel for mixture from the extruder 30. The fourth plate 204 also comprises a through-hole 241 which communicates with the outlet of the fourth extruder 40 in order to transfer the mixture discharged thereby into the transfer channel formed in a third plate 203.

The third plate 203 comprises a cavity 232 which is recessed in the thickness of the wall of the plate, the cavity 232 having a shape which is flared upwards in the direction of the extrusion die from a base of circular form having a diameter equal to the diameter of the outlet hole of the sheath of the extruder 40 and the through-hole 241. The cavity 232 thus forms a third transfer channel for mixture from the extruder 40.

Of course, as in the example of FIGS. 3 to 6, the plates 201, 202, 203, 204 are held together by lateral walls 51, 52 and a spacer 53 in order to form an extrusion head in the form of a block or unitary assembly. Such an extrusion head is applied in a sealed manner to the outlet of the extruders 10, 20, 30, 40. In an advantageous variant of the disclosure, the support 90 is in two portions, at least one 90' being axially movable in order to take up the extrusion head 50 and to apply the outlet holes of the extruders in a sealed manner to the corresponding faces opposite the extrusion head 50. In this manner, after the extrusion head has been installed inside the support, one of the lateral walls of the support is moved closer in order to ensure the sealing between the support and the extrusion head.

Such an extrusion head produced in the form of interchangeable plates makes it possible, via an advantageous arrangement of through-holes and transfer channels between the different plates to maintain the initial arrangement of the extruders and to change only the plates of the extrusion head, which is itself interchangeable.

This is because, in the coextrusion machines of the prior art, the stacking order of the extruded bands must follow the arrangement order of the extruders in the installation. This is because each outlet channel of the extruder opens in transfer channels supported by elements which form an integral part of the machine. Changing them involves very complex disassembly operations. Consequently, it is preferable to retain the initial configuration of the machine and to adapt the speed of the extruder to the new profile. Such a new warm up of the extruder is very time-consuming.

Furthermore, with the solution of the disclosure, all the dimensional portions of the machine are assembled in a removable block. Such a block is produced using mutually parallel planar plates which are perpendicular to the output direction of the mixture flow and which are provided with openings and transfer channels which enable the arrival order of the mixtures in the extrusion die to be reversed. This solution enables the installation to be very flexible, adapting to a great diversity of even the most complex coextruded profiles, whilst reducing the waiting time and preparation time of the installation or the components thereof.

During operation, an appropriate extrusion head which is adapted to the profile to be produced by means of coextrusion is initially selected. Such an extrusion head 50 is produced beforehand by stacking mutually parallel plates 201, 202, 203, 204 which are parallel with the inner faces of the lateral walls 51, 52 of the extrusion head and fixing them together, for example, using a fixing screw. The extrusion head is placed in a furnace to reheat and bring it to the operating temperature of the installation.

The extrusion head is then gripped, for example, by a robotic arm (not visible in the drawings) and introduced into the housing 95 of the support 90 of the installation, as illustrated in FIG. 4. The extrusion head continues to be introduced until it is axially blocked as a result of the inclination of the lateral wall thereof and that of the support. At this time, the inlet holes in the extrusion head and those of the output of the extruders communicate in a sealed manner and it is possible to start the extrusion operation.

Other variants and embodiments of the disclosure may be envisaged without departing from the scope of the claims.

In this manner, it is possible to arrange more than four extruders which are arranged at one side and the other of the extrusion head, increasing the number of transfer channels and/or through-holes and/or removable plates as a result, at least two of them working with different mixtures and some of the others with the same mixture of elastomers.

The invention claimed is:

1. An installation for producing a profiled band based on several mixtures of elastomers of a different composition through coextrusion, comprising at least two extruders for supplying a mixture of elastomers to an extrusion head, the extrusion head comprising an assembly of at least two plates which are arranged side by side, each plate comprising at least one cavity which forms a transfer channel that enables a material from an associated one of the extruders to be channelled towards an outlet hole, wherein the plates are arranged such that their major dimensions extend substantially transversely relative to an output direction of the associated one of the extruders and towards ends that are located adjacent the outlet hole, and wherein the transfer channels extend lengthwise in directions that are perpendicular to the longitudinal axes of the extruders.

2. The installation according to claim 1, wherein an outlet hole of at least one of the extruders communicates directly without changing either direction or outlet cross-section with an inlet hole in the cavity of one of the plates.

3. The installation according to claim 1, wherein the plates are planar and mutually parallel.

4. The installation according to claim 2, wherein the transfer channels extend in directions parallel with major planes of the respective plates and wherein the transfer channels extend in a directions perpendicular to the longitudinal axes of the associated extruders.

5. The installation according to claim 1, wherein at least one plate comprises a through-hole which enables an outlet hole of one of the extruders to be connected to the cavity of an adjacent plate.

6. The installation according to claim 1, wherein the plates are removable and are held together on a common support.

7. The installation according to claim 6, wherein the support and the plates form an interchangeable extrusion head which is connected directly to the outlet holes of the extruders.

8. The installation according to claim 7, wherein the extrusion head can be moved in translation between a position introduced into support of the installation and a position removed therefrom.

9. The installation according to claim 7, further including a means for rapidly fixing the extrusion head to the support.

10. The installation according to claim 1, wherein the extruders are arranged at one side and the other of the extrusion head.

11. The installation according to claim 1, further including four extruders which are arranged in pairs at one side and the other of the extrusion head and four removable plates which are each provided with at least one transfer channel for the mixture from one of the extruders towards an extrusion die.

12. A method of producing a profiled band based on a plurality of mixtures of elastomers of different composition by coextrusion using at least two extruders which supply a mixture of elastomer to an extrusion head, the method comprising the steps of:
   selecting a set of at least two plates which are arranged side by side, each plate comprising at least one cavity which enables the mixture from a dedicated extruder to be channelled towards an outlet hole and the plates are arranged such that a major dimension of each plate extends substantially transversely relative to an output direction of the mixture flow of an associated one of the extruders within the extrusion head and to an end that is located adjacent the outlet hole; and
   extruding the band of profiled product.

13. The method according to claim 12, wherein the plates are arranged relative to the extruders so that outlet holes of the associated extruders communicate without changing direction with the inlet hole in the cavity of a plate.

14. The method according to claim 12, wherein at least one plate comprises a through-hole which enables an outlet hole of one of the extruders to be connected to the cavity of an adjacent plate.

15. The method according to claim 12, wherein the extrusion head is a first extrusion head and further including the steps of removing the first extrusion head from the installation and replacing the first extrusion head with another extrusion head which comprises a set of plates different from the first extrusion head.

* * * * *